March 14, 1961 L. L. BONHAM ET AL 2,975,378
METHOD OF FREQUENCY SWEEPING A PULSED OSCILLATOR
Filed April 30, 1959
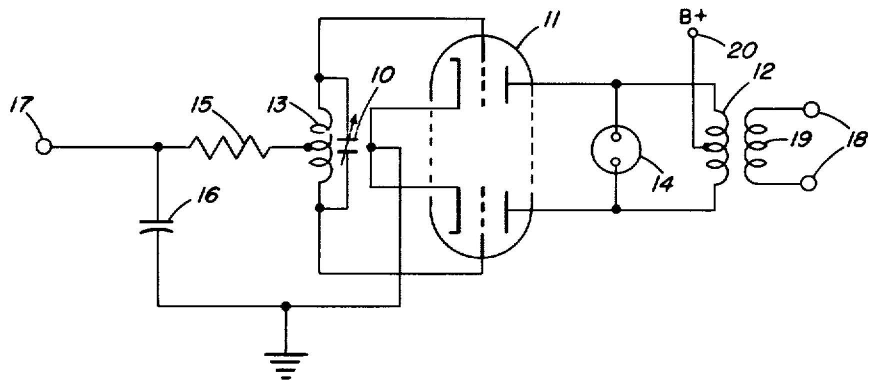
INVENTORS
HARRY E. CULVER
HILL MONTAGUE III
LEWIS L. BONHAM
BY R. I. Tompkins
ATTORNEY

United States Patent Office 2,975,378

Patented Mar. 14, 1961

2,975,378

METHOD OF FREQUENCY SWEEPING A PULSED OSCILLATOR

Lewis L. Bonham, Fairfax, and Hill Montague III and Harry E. Culver, Alexandria, Va., assignors, by mesne assignments, to the United States of America as represented by the Secretary of the Navy Filed Apr. 30, 1959, Ser. No. 810,197

1 Claim. (Cl. 332—17)

The present invention relates to oscillators and more particularly to oscillators which may by extremely simple means generate pulses which can be received over a wide frequency band. This is accomplished by connecting a gaseous diode across the tank circuit of the oscillator. Radio frequency voltage, impressed across the diode terminals, produces ionization within the diode. This ionization does not occur immediately but builds up over a period of several microseconds. During this build up, the dielectric constant and hence the capacity of the diode changes continuously causing a shift in the resonant frequency of the tank circuit and hence in the frequency of the oscillations. The output, therefore, is a radio frequency pulse with continuous frequency modulation over a period of several microseconds.

An object of the present invention is to provide a means of simultaneously amplitude and frequency modulating an oscillator.

Another object is to provide a system to generate a radio frequency pulse having a much broader frequency spectrum than would result from the amplitude modulation of the pulse alone.

A further object of the invention is the provision of a simple means of generating a pulse which can be received over a wide frequency band.

Other objects and many of the attendant advantages of this invention will be readily appreciated as the same becomes better understood by reference to the following detailed description when considered in connection with the accompanying drawings wherein; there is shown a push-pull, tuned-plate, tuned-grid oscillator having a dual triode 11, plate tank coil 12, grid tank coil 13 and capacitor 10. The plate tank circuit includes in addition to coil 12 a gaseous diode 14 which supplies capacitive reactance. Plate voltage is supplied through terminal 20. Resistor 15 and capacitor 16 comprise a network through which a signal is coupled to grid coil 13. The output radio frequency energy is coupled to output terminals 18 through coupling coil 19.

In operation, a negative voltage is normally applied at point 17 to the center tap of grid coil 13. This voltage is sufficient to prevent the circuit from oscillating. When a positive pulse is applied at terminal 17, the circuit will oscillate creating a radio frequency voltage across coil 12 which tends to ionize diode 14. Diode 14 does not ionize immediately but ionizes over a period of several microseconds. During the build up of the ionization the capacity of diode 14 changes continuously causing a shift in the resonant frequency of tank circuit and hence the frequency of the oscillation. The output at 18, therefore, is a radio frequency pulse with continuous frequency modulation over a period of several microseconds.

In another mode of operation, a relatively long pulse with a sloping top is applied at terminal 17. This causes the frequency modulation to be controlled by the amplitude of the oscillation since the instantaneous valve of the voltage applied to the grids of tube 11 controls the amplitude of the oscillations. Arbitrary wave shapes applied to the grids of tube 11 would produce corresponding frequency modulation.

The gaseous diode 14 also has a regulating effect on the amount of energy coupled out of the circuit since the energy it absorbs increases with the degree of ionization. An increase in the amplitude of the oscillations results in greater ionization and thus more energy is absorbed in diode 14 while the energy coupled out remains relatively constant.

Obviously many modifications and variations of the present invention are possible in the light of the above teachings. It is therefore to be understood that within the scope of the appended claims the invention may be practiced otherwise than as specifically described.

What is claimed is:

A modulation system for simultaneously amplitude and frequency modulating an oscillator comprising: an oscillator, said oscillator having first and second triodes, each having a cathode, grid and plate; a tuned grid circuit connected across the grids of said first and second triodes and having an amplitude modulating input circuit coupled thereto, a tuned plate circuit connected across the plates of said first and second triodes and having an output circuit coupled thereto, said tuned plate circuit consisting of a center tapped plate tank coil and a gaseous diode connected in parallel, said gaseous diode being responsive to the output of said oscillator to shift the resonant frequency of said tuned plate circuit, thereby varying the output frequency of said oscillator.

References Cited in the file of this patent

UNITED STATES PATENTS 2,508,751 Drugmand ------------ May 23, 1950

OTHER REFERENCES

Pub. I: Electrically Variable Gas-Dielectric Capacitor by Gordon, Electronics, January 1956, pp. 158 and 160.